United States Patent
Hughes

(10) Patent No.: US 6,308,219 B1
(45) Date of Patent: Oct. 23, 2001

(54) ROUTING TABLE LOOKUP IMPLEMENTED USING M-TRIE HAVING NODES DUPLICATED IN MULTIPLE MEMORY BANKS

(75) Inventor: John H. Hughes, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/127,253

(22) Filed: Jul. 31, 1998

(51) Int. Cl.[7] ........................ G06F 15/173; H04L 12/56
(52) U.S. Cl. ............................... 709/238; 370/392
(58) Field of Search .................................. 709/238, 242; 370/392, 422; 707/101, 103

(56) References Cited

U.S. PATENT DOCUMENTS

| | | |
|---|---|---|
| Re. 33,900 | 4/1992 | Howson . |
| 4,131,767 | 12/1978 | Weinstein . |
| 4,161,719 | 7/1979 | Parikh et al. . |
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Fraser . |
| 4,532,626 | 7/1985 | Flores et al. . |
| 4,644,532 | 2/1987 | George et al. . |
| 4,646,287 | 2/1987 | Larson et al. . |
| 4,677,423 | 6/1987 | Benvenuto et al. . |
| 4,679,189 | 7/1987 | Olson et al. ........................ 370/60 |

(List continued on next page.)

FOREIGN PATENT DOCUMENTS

| | | |
|---|---|---|
| 0 384 758 A2 | 8/1990 | (EP) . |
| 0 431 751 A1 | 6/1991 | (EP) . |
| 0 567 217 A2 | 10/1993 | (EP) . |
| WO93/07569 | 4/1993 | (WO) . |
| WO93/07692 | 4/1993 | (WO) . |
| WO94/01828 | 1/1994 | (WO) . |
| WO95/20850 | 8/1995 | (WO) . |

OTHER PUBLICATIONS

Pei et al., "VLSI Implementation of Routing Tables: tries and CAMs," Proc. of INFOCOM '91, IEEE, pp. 515–524, Apr. 1991.*

(List continued on next page.)

Primary Examiner—Zarni Maung
Assistant Examiner—Andrew Caldwell
(74) Attorney, Agent, or Firm—Skjerven Morrill MacPherson LLP; Sam G. Campbell, III

(57) ABSTRACT

The invention provides a method and system for rapid access to one or more M-tries for responding to header information. The M-tries are stored in a plurality of memory banks, which are accessed in parallel to provide relatively greater access throughput. Parts of the M-tries that are (or are expected to be) frequently referenced are stored in multiple banks of the memory, to provide concurrent simultaneous access for those parts of the M-tries for parallel lookup of multiple routes. Regions of the multiple banks of the memory can be dynamically reallocated to provide improved access through-put to those multiple banks. The invention can be applied to routing decisions in response to destination addresses, to combinations of destination and source addresses (either for unicast or multicast routing), to access control decisions, to quality of service decisions, to accounting, and to other administrative processing in response to header information.

34 Claims, 2 Drawing Sheets

U.S. PATENT DOCUMENTS

| | | |
|---|---|---|
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran, et al. . |
| 4,819,228 | 4/1989 | Baran, et al. . |
| 4,827,411 | 5/1989 | Arrowood, et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,767 | 10/1990 | Kinoshita et al. ............... 365/49 |
| 4,965,772 | 10/1990 | Daniel et al. . |
| 4,970,678 | 11/1990 | Sladowski et al. . |
| 4,979,118 | 12/1990 | Kheradpir ......................... 364/436 |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,034,919 | 7/1991 | Sasai et al. ....................... 365/49 |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner .............................. 370/94.1 |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts ............................ 395/200 |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. ................ 730/85.13 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,413 | * 1/1995 | McAuley et al. ................. 370/54 |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 | 12/1995 | White et al. . |
| 5,485,455 | 1/1996 | Dobbins et al. . |
| 5,490,140 | 2/1996 | Abensour et al. . |
| 5,490,258 | 2/1996 | Fenner ............................. 395/401 |
| 5,491,687 | 2/1996 | Christensen et al. . |
| 5,491,804 | 2/1996 | Heath et al. . |
| 5,497,368 | 3/1996 | Reijnierse et al. . |
| 5,497,478 | * 3/1996 | Murata ............................. 711/157 |
| 5,504,747 | 4/1996 | Sweasey . |
| 5,509,006 | 4/1996 | Wilford et al. . |
| 5,517,494 | 5/1996 | Green . |
| 5,519,704 | 5/1996 | Farinacci et al. . |
| 5,519,858 | 5/1996 | Walton et al. .................. 395/600 |
| 5,526,489 | 6/1996 | Nilakantan et al. . |
| 5,530,963 | 6/1996 | Moore et al. . |
| 5,535,195 | 7/1996 | Lee . |
| 5,539,734 | 7/1996 | Burwell et al. . |
| 5,541,911 | 7/1996 | Nilakantan et al. . |
| 5,546,370 | 8/1996 | Ishikawa . |
| 5,546,390 | * 8/1996 | Stone ................................. 370/60 |
| 5,555,244 | 9/1996 | Gupta et al. . |
| 5,561,669 | 10/1996 | Lenney et al. . |
| 5,583,862 | 12/1996 | Callon . |
| 5,592,470 | 1/1997 | Rudrapatna et al. . |
| 5,598,581 | 1/1997 | Daines et al. . |
| 5,600,798 | 2/1997 | Cherukuri et al. . |
| 5,602,770 | 2/1997 | Ohira ................................. 365/49 |
| 5,604,868 | 2/1997 | Komine et al. . |
| 5,608,726 | 3/1997 | Virgile . |

| | | |
|---|---|---|
| 5,617,417 | 4/1997 | Sathe et al. . |
| 5,617,421 | 4/1997 | Chin et al. . |
| 5,630,125 | 5/1997 | Zellweger ............................ 395/614 |
| 5,631,908 | 5/1997 | Saxe . |
| 5,632,021 | 5/1997 | Jennings et al. . |
| 5,634,010 | 5/1997 | Ciscon et al. . |
| 5,638,359 | 6/1997 | Peltola et al. . |
| 5,644,718 | 7/1997 | Belove et al. . |
| 5,659,684 | 8/1997 | Giovannoni et al. . |
| 5,666,353 | 9/1997 | Klausmeier et al. . |
| 5,673,265 | 9/1997 | Gupta et al. . |
| 5,678,006 | 10/1997 | Valizadeh et al. . |
| 5,680,116 | 10/1997 | Hashimoto et al. . |
| 5,684,797 | 11/1997 | Aznar et al. . |
| 5,687,324 | 11/1997 | Green et al. . |
| 5,689,506 | 11/1997 | Chiussi et al. . |
| 5,694,390 | 12/1997 | Yamato et al. . |
| 5,724,351 | 3/1998 | chao et al. . |
| 5,740,097 | 4/1998 | Satoh ..................................... 365/49 |
| 5,748,186 | 5/1998 | Raman ................................. 345/302 |
| 5,748,617 | 5/1998 | McLain, Jr. . |
| 5,754,547 | 5/1998 | Nakazawa . |
| 5,781,772 * | 7/1998 | Wilkinson, III et al. ................. 707/3 |
| 5,787,430 * | 7/1998 | Doeringer et al. ................... 707/100 |
| 5,802,054 | 9/1998 | Bellenger . |
| 5,835,710 | 11/1998 | Nagami et al. . |
| 5,841,874 | 11/1998 | Kempke et al. ........................ 380/50 |
| 5,842,224 * | 11/1998 | Fenner ................................. 711/202 |
| 5,854,903 | 12/1998 | Morrison et al. . |
| 5,856,981 | 1/1999 | Voelker . |
| 5,892,924 | 4/1999 | Lyon et al. ...................... 395/200.75 |
| 5,898,686 | 4/1999 | Virgile . |
| 5,903,559 | 5/1999 | Acharya et al. . |
| 5,909,440 * | 6/1999 | Ferguson et al. .................... 370/389 |
| 5,917,821 * | 6/1999 | Gobuyan et al. .................... 370/392 |
| 5,991,817 * | 11/1999 | Rowett et al. ........................ 709/250 |
| 6,011,795 * | 1/2000 | Varghese et al. ..................... 370/392 |
| 6,014,659 * | 1/2000 | Wikinson, III et al. ................. 707/3 |
| 6,018,524 * | 1/2000 | Turner et al. ........................ 370/392 |
| 6,023,733 * | 2/2000 | Periasamy et al. ................... 709/241 |
| 6,052,683 * | 4/2000 | Irwin ........................................ 707/8 |
| 6,061,712 * | 5/2000 | Tzeng ................................. 709/202 |
| 6,067,574 * | 5/2000 | Tzeng ................................. 709/247 |
| 6,115,716 * | 9/2000 | Tikkanen et al. .................... 707/100 |
| 6,141,738 * | 10/2000 | Munter et al. ....................... 711/206 |
| 6,192,051 * | 2/2001 | Lipman et al. ....................... 370/389 |
| 6,212,184 * | 4/2001 | Venkatachary et al. ............. 370/392 |

OTHER PUBLICATIONS

M. Allen, "Novell IPX Over Various Wan Media (IPX–WAN)," Novell, Inc. Dec. 1993, pp. 1–20.

Donald Becker, "3c589.c EtherLink3 Ethernet Driver for Linux," 1994.

Shyamal Chowdhury and Kazem Sohraby, "Alternative Bandwidth Allocation Algorithms ForPacket Video In ATM Networks," Infocom 1992, IEEE, pp. 1061–1068.

W. Doeringer, G. Karjoth and M. Nassehi, "Routing on Longest–Matching Prefixes," IEEE / ACM Transactions on Networking, vol. 4, No. 1, Feb. 1996, pp. 86–97.

Hiroshi Esaki, Yoshiyuki Tsuda, Takeshi Saito, and Shigeyasu Natsubori, "Datagram Delivery In An ATM–Internet," IEICE Trans. Communication, vol. E77–B, No. 3, Mar. 1994.

IBM© Technical Disclosure Bulletin, "Method and Apparatus For The Statistical Multiplexing of Voice, Data, and Image Signals," vol. 35, No. 6, IBM Corporation, Nov. 1992, pp. 409–411.

Tong–Bi Pei and Charles Zukowski, "Putting Routing Tables In Silicon," IEEE Network, Jan. 1992, vol. 6, No. 1, pp. 42–50.

D. Perkins, "Requirements For An Internet Standard Point––to–Point Protocol," Carnegie Mellon University, Dec. 1993.

W. Simpson, "The Point–to–Point Protocol (PPP)," Daydreamer, Dec. 1993, pp. 1–47.

Paul F. Tsuchiya, "A Search Algorithm For Table Entries With Non–Contiguous Wildcarding," pp. 1–10, (unpublished paper 1992).

H. Zhang and D. Ferrari, "Rate–Controlled Static–Priority Queuing," Computer Science Division, University of Berkeley, IEEE Network, Mar. 1993, pp. 227–235.

William Stallings Ph.D., *"Data and Computer Communications,"* Macmillan Publishing Company and Collier Macmillan Publishers 1985, pp. 328–334.

William Stallings, Ph.D., "Data and Computer Communications," second edition, Macmillan Publishing Company, New York, and Collier Macmillan Publishers, London, pp. 328–334.

William Stallings, Ph.D., "Data and Computer Communications," fourth edition, Macmillan Publishing Company, New York, Maxwell Macmillan Canada, Toronto, and Maxwell Macmillan International, pp. 328–334.

* cited by examiner

ROUTING TABLE LOOKUP IMPLEMENTED USING M-TRIE HAVING NODES DUPLICATED IN MULTIPLE MEMORY BANKS

BACKGROUND OF THE INVENTION

1. Field of the Invention

This invention relates to routing table lookup.

2. Related Art

In a computer network, routing devices receive messages at one of a set of input interfaces, and forward them on to one of a set of output interfaces. It is advantageous for such routing devices to operate as quickly as possible, to keep up with the rate of incoming messages. In a packet routing network, each packet includes a header, including information used for routing the packet to an output interface for forwarding to a destination device (or to another routing device for further forwarding). Header information used for routing can include a destination address, a source address, and other information such as a destination device port, a source device port, a protocol, packet length, and a priority for the packet. Header information used by routing devices for other administrative tasks can include information about access control, accounting, quality of service, and other purposes.

One problem in the known art is that there can be a relatively large number of possible destinations, and therefore a correspondingly large number of possible output interfaces (herein called "routes"), one of which is to be associated with the incoming packet. It is advantageous for the routing devices to match the associated output interface with the incoming packet as quickly as possible. Due to the nature of routing in computer networks, it is also advantageous for the routing devices to match the associated output interface with the longest possible sub-string of the header information (such as the destination address or a combination of the destination address and the source address).

One method in the known art is to use a branching tree, which differentiates among possible routes in response to each individual bit of the header information. A variant of this method is to generate an M-way branching tree (herein called an "M-trie," which has up to M possible branches at each node). An M-trie differentiates among possible routes in response to groups of bits in the header information.

One problem in the known art is that using M-tries generates frequent references to memory to access the nodes of the M-trie. The access speed of the memory thus provides a limitation on the speed of the routing device. Moreover, some of the nodes of the M-trie near its root are relatively more frequently referenced than other nodes. The access speed of the memory for repeated references to the same location thus provides a second limitation on the speed of the routing device.

Accordingly, it would be desirable to provide a method and system for rapid access to one or more M-tries for responding to header information. This advantage is achieved in an embodiment of the invention in which the M-tries are stored in a plurality of memory banks, some of which duplicate parts of the M-tries that are frequently referenced.

SUMMARY OF THE INVENTION

The invention provides a method and system for rapid access to one or more M-tries for responding to header information. The M-tries are stored in a plurality of memory banks, which are accessed in parallel to provide relatively greater access throughput. Parts of the M-tries that are (or are expected to be) frequently referenced are stored in multiple banks of the memory, to provide concurrent simultaneous access to those parts of the M-tries for parallel lookup of multiple routes.

In a preferred embodiment, regions of the multiple banks of the memory can be dynamically reallocated to provide improved access throughput to those multiple banks. The invention can be applied to routing decisions in response to destination addresses, to combinations of destination and source addresses (either for unicast or multicast routing), to access control decisions, to quality of service decisions, to accounting, and to other administrative processing in response to header information.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
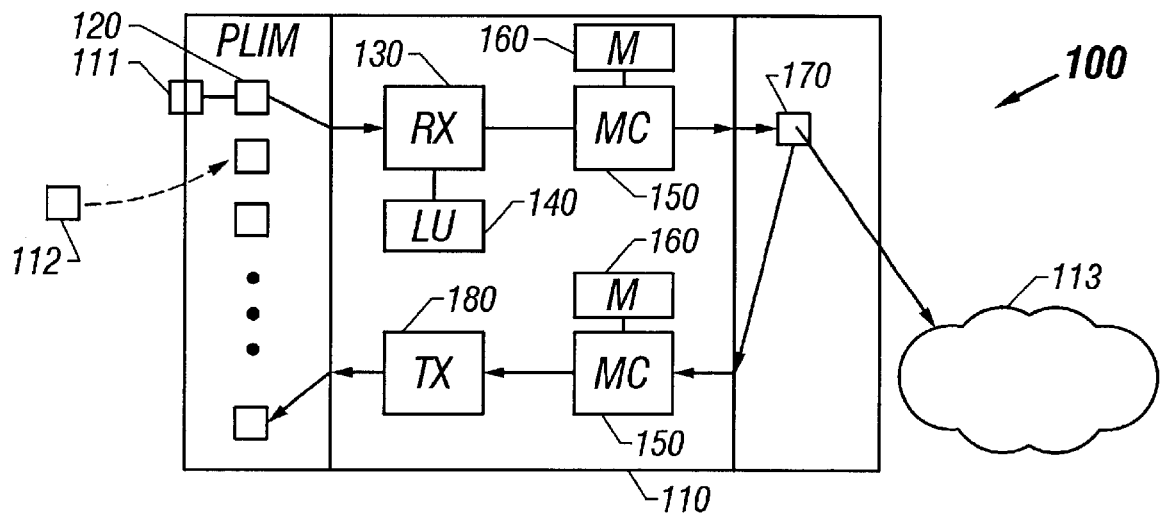
FIG. 1 shows a block diagram of an improved system for routing table lookup.

FIG. 1 shows a block diagram of an improved system for routing table lookup.

A system 100 for routing table lookup includes one or more routers 110.

The router 110 is coupled to a set of physical interfaces 111 for receiving and for transmitting packets 112 from non-router devices. The router 110 is also coupled to one or more fabric interfaces 113 for receiving and for transmitting packets 112 to the network fabric.

Each router 110 includes a set of device interface elements 120 PLIM, a receive element 130 Rx, a lookup table 140, a set of memory controllers 150, memory 160, one or more fabric interface elements 170, and a transmit element 180.

The device interface elements 120 are coupled to the physical interfaces 111, and are disposed for receiving and for transmitting packets 112.

The receive element 130 Rx is coupled to the device interface elements 120 and to the lookup table 140. The receive element 130 operates in conjunction with the lookup table 140 to perform receive operations on received packets 112. These receive operations can include determining packet 112 integrity, isolating routing information from a set of packet headers 113 of the packets 112, and other functions.

A receive memory controller 150 is coupled to the receive element 130 and to a receive memory 160. The receive memory controller 150 operates in conjunction with the receive memory 160 to determine routing treatments for received packets 112. These routing treatments can include one or more of the following:

selection of one or more output interfaces to which to forward received packets 112;

Selection can be responsive to the destination device, to the source and destination device, or to network flows as described in one or more of the following patent applications.

U.S. application Ser. No. 08/581,134, now U.S. Pat. No. 6,091,725, titled "Method For Traffic Management, Traffic Prioritization, Access Control, and Packet Forwarding in a Datagram Computer Network", filed Dec. 29, 1995, in the name of inventors David R. Cheriton and Andreas V. Bechtolsheim, assigned to Cisco Technology, Inc.;

U.S. application Ser. No. 08/655,429, titled "Network Flow Switching and Flow Data Export", filed May 28, 1996, in the name of inventors Darren Kerr and Barry Bruins, and assigned to Cisco Technology, Inc.; and U.S. application Ser. No. 08/771,438, titled "Network Flow Switching and Flow Data Export", filed Dec. 20, 1996, in the name of inventors Darren Kerr and Barry Bruins, assigned to Cisco Technology, Inc., PCT International Application PCT/US 96/20205, titled "Method For Traffic Management, Traffic Prioritization, Access Control, and Packet Forwarding in a Datagram Computer Network", filed Dec. 18, 1996, in the name of inventors David R. Cheriton and Andreas V. Bechtolsheim, and assigned to Cisco Technology, Inc.; and U.S. application Ser. No. 08/886,900, Express Mail Mailing No. EM053698725US, titled "Network Flow Switching and Flow Data Export", filed Jul. 2, 1997, in the name of inventors Darren Kerr and Barry Bruins, assigned to Cisco Technology, Inc.

Each of these applications is hereby incorporated by reference as if fully set forth herein. These applications are collectively referred to herein as the "Netflow Routing Disclosures."

Selection can also be responsive to unicast routing, multicast routing, or a combination thereof determination of ACL (access control list) treatment for received packets 112;

determination of QoS (quality of service) treatment for received packets 112;

determination of one or more accounting records or treatments for received packets 112; and determination of other administrative treatment for received packets 112.

The receive memory 160 includes routing treatment information, disposed in a memory data structure responsive to information in packet 112 and it's packet header. The memory data structure is further described with regard to FIG. 2.

The fabric interface elements 170 couple the router 100 to communication links to other routers 110 in the network fabric.

A transmit memory controller 150 is coupled to the fabric interface elements 170 and to a transmit memory 160. The transmit memory controller 150 operates in conjunction with the transmit memory 160 to determine routing treatments for packets 112 for transmission. These routing treatments can be similar to the routing treatments for received packets 112 and can include one or more of the same treatments.

The transmit memory 160 includes routing treatment information, disposed in a memory data structure similar to that of the receive memory 160.

The transmit memory controller 150 is coupled to the transmit element 180 Tx. The transmit element 180 operates to perform transmit operations on packets 112 for transmission. These transmit operations can include rewriting packet headers, altering routing information in the packet headers, and other functions.

Memory Data Structure

Figure 2:
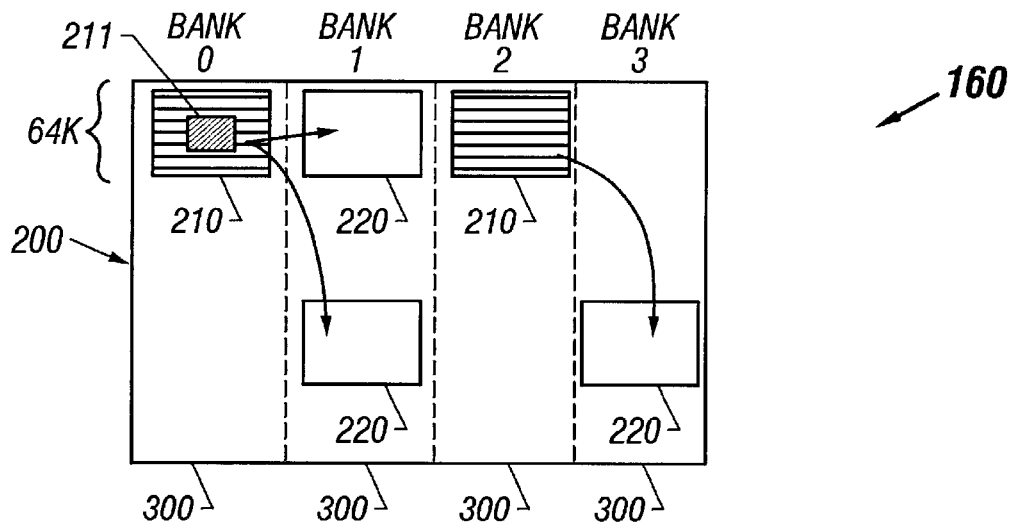
FIG. 2 shows a memory data structure in an improved method for routing table lookup.

FIG. 2 shows a memory data structure in an improved method for routing table lookup.

In a preferred embodiment, the memory data structure is like that described for M-Tries in one or more of the Netflow Routing Disclosures.

The receive memory 160 includes at least one tree structure 200 (sometimes known as a "trie" structure), as described for M-Tries in one or more of the Netflow Routing Disclosures. Each tree structure 200 includes a set of nodes 210, one of which is designated as a root node 210, and a set of leaves 220. The root node 210 and each other node 210 include a set of entries 211, each of which points to either a sub-node 210 or to an associated leaf 220.

Each leaf 220 includes a set of information for a routing treatment to be used for packets 112. As noted herein, the routing treatment can include one or more of the following:

one or more output interfaces to which to forward packets 112;

ACL treatment for packets 112;

QoS treatment for packets 112;

accounting treatments for packets 112; and other administrative treatment for packets 112.

In a preferred embodiment in which each node 210 provides 16 bits of branching width, each node 210 includes sufficient entries 211 to use 64K bytes of the memory 160. At least one region 220 of the memory 160 is about 64K bytes and is used for the root node 210. In alternative embodiments, each node 210 may provide a different amount of branching width, such as 4 bits, 8 bits, 12 bits, or some variable responsive to the nature of the packet traffic.

Parallel Memory Operation

Figure 3:
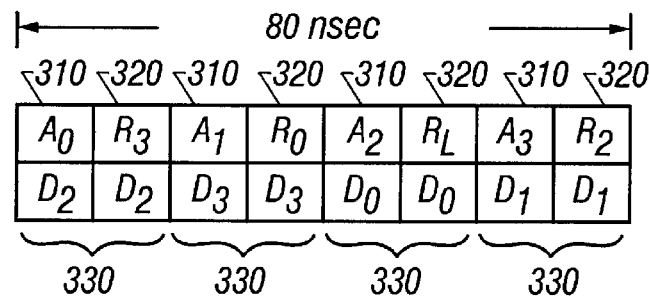
FIG. 3 shows a timing diagram for use of a receive or transmit memory.

FIG. 3 shows a timing diagram for use of a receive or transmit memory.

The receive memory 160 includes an SDRAM (synchronous dynamic random access memory), having a plurality of memory banks 300. As known in the art of computer memories, each memory bank 300 can be accessed separately and in parallel using a memory activate signal 310 and a memory read signal 320. In response to the memory activate signal 310 and the memory read signal 320, the memory 160 provides a data output signal 330.

In a preferred embodiment, the receive memory 160 includes four memory banks 300 (bank 0, bank 1, bank 2, and bank 3). The receive memory controller 150 provides a periodic sequence of four memory activate signals 310 (A0, A1, A2, and A3) and four memory read signals 320 (R0, R1, R2, and R3), and receives a periodic sequence of four data output signals 330 (D0, D1, D2, and D3). Thus, the four memory banks 300 are effectively operated in parallel to provide quadruple the amount of throughput of a single memory bank 300.

In a preferred embodiment, each memory bank 300 of the receive memory 160 operates at a cycle speed of about 80 nanoseconds. The memory activate signal 310 A0 is presented to memory bank 300 bank0 at an offset of about 0 nanoseconds into the cycle. The memory read signal 320 R0 is presented to memory bank 300 bank0 at an offset of about 30 nanoseconds into the cycle. The data output signal 330 D0 is presented from the memory bank 300 bank0 at an offset of about 60 nanoseconds into the cycle, and lasts about 20 nanoseconds to read out about 32 bits of data. CIS-043

The memory activate signal 310, memory read signal 320, and data output signal 330 occur at offsets in the cycle that are similarly related.

Distributed Storage of the M-tries

The various nodes 210 of the tree structure 200 are recorded in the memory 160 in the various memory banks 300. The receive memory controller 150 allocates the nodes 210 (and associated sub-trees depending from those nodes 220) of the tree structure 200 so that concurrent access in referencing those nodes 210 can be optimized. This optimization can include the following:

(1) the root node 210 is recorded in multiple banks 300;
(2) other frequently referenced nodes 210 are stored in multiple banks 300; and
(3) nodes 210 are dynamically reallocated to new regions of the multiple banks 300.

In the first optimization, because the root node 210 is so frequently referenced, it is recorded in each memory bank 300.

In the second optimization, those nodes 210 that are frequently referenced are copied to multiple memory banks 300. The memory controller 150 can determine whether particular nodes 210 are sufficiently frequently referenced by maintaining a reference or frequency count at the node 210 or in a separate table. Those nodes 210 that are referenced often can be copied to two of the four memory banks 300, while those nodes 210 that are referenced even more often can be copied to three or four of the four memory banks 300. Similarly, those nodes 210 that have been copied to multiple memory banks 300 but are no longer frequently referenced, are deleted from one or more memory banks 300 to restrict them to fewer memory banks, down to a single memory bank 300.

In the third optimization the receive memory controller 150 determines whether particular memory banks 300 have recorded nodes 210 that are collectively relatively infrequently or relatively frequently referenced. If a first memory bank 300 has a collection of nodes 210 that are much more frequently referenced than a second memory bank 300, it can occur that concurrent use of the memory 160 is reduced by frequent attempts at multiple access to the same contested memory bank 300. Accordingly, in these cases, the receive memory controller 150 reallocates at least some nodes 210 from the first to the second memory bank 300. Similarly, if the frequency of references to sets of recorded nodes 210 changes, the receive memory controller 150 re-reallocates at least some nodes 210 from the first to the second memory bank 300 or vice versa.

Recording and Using Routing Table

Figure 4:
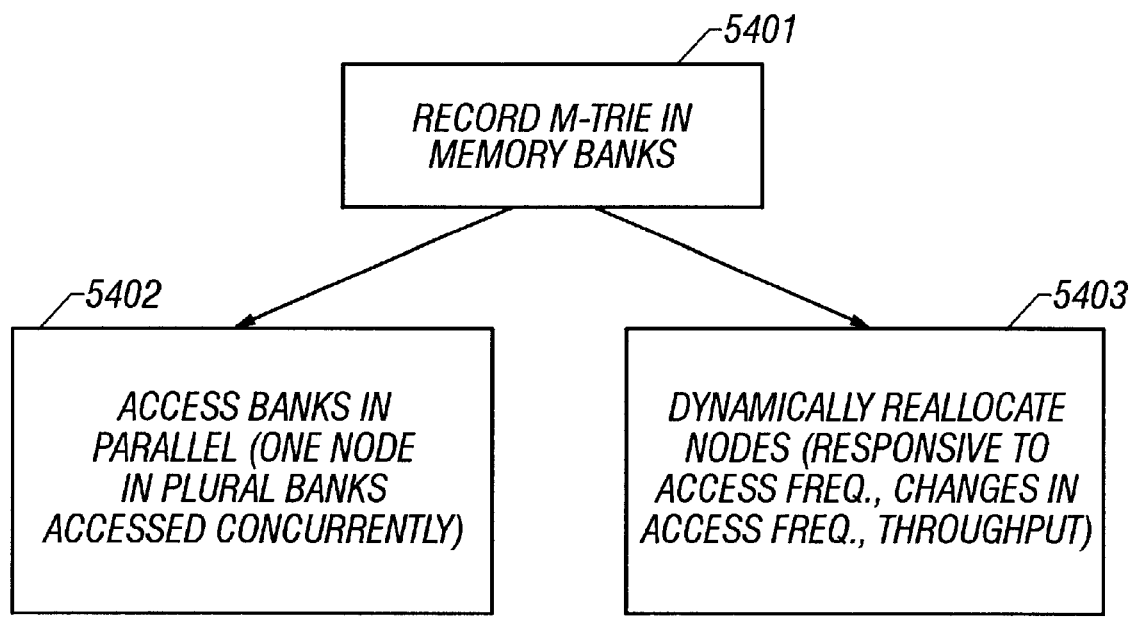
FIG. 4 shows a flowchart for recording and using a routing table.

FIG. 4 shows a flowchart for recording and using a routing table. Step S401 shows recording an M-trie in memory banks. At least one node 210 is recorded in at least two memory banks.

Steps S402 and/or S403 can follow step S401. In step S402, at least two memory banks are accessed in parallel. One node recorded in plural memory banks can be accessed concurrently. In step S403, nodes are dynamically reallocated. Nodes can be reallocated, for example, responsive to access frequency, changes in access frequency, throughput, and other factors.

M-trie Contents

Figure 5:
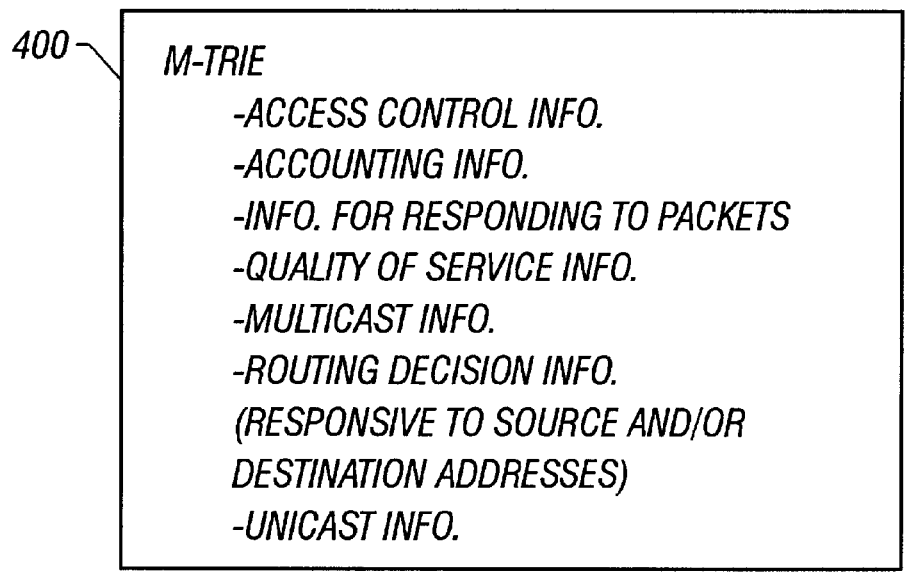
FIG. 5 shows possible contents of an M-trie.

FIG. 5 shows possible contents of an M-trie. M-tie 400 can include access control information, accounting information, information for responding to packets, quality of service information, multicast information, routing decision information (responsive to source and/or destination addresses), and/or unicast information. Other information can be included.

Alternative Embodiments

Although preferred embodiments are disclosed herein, many variations are possible which remain within the concept, scope, and spirit of the invention, and these variations would become clear to those skilled in the art after perusal of this application.

For example, as noted herein, the invention has wide applicability to a variety of operations possibly performed by routers.

What is claimed is:

1. A system comprising:
    a plurality of memory banks, said plurality of memory banks collectively recording at least one M-trie responsive to header information in a set of packets; and
    means for dynamically reallocating said nodes within said plurality of banks;
    wherein at least one node of said M-trie is recorded in at least two of said banks.

2. A system as in claim 1, wherein said plurality of memory banks are disposed for concurrent access.

3. A system as in claim 1, comprising means for dynamically reallocating said nodes within said plurality of banks responsive to changes in relative frequency of access to said nodes.

4. A system as in claim 1, comprising means for dynamically reallocating said nodes within said plurality of banks responsive to improving access throughput for references to said nodes.

5. A system as in claim 1, comprising means for dynamically reallocating said nodes within said plurality of banks responsive to relative frequency of access to said nodes.

6. A system as in claim 1, wherein said at least one node is a node expected to be referenced frequently.

7. A system as in claim 1, wherein said at least one node is a root node for one of said at least one M-tries.

8. A system as in claim 1, wherein said at least one node is disposed for a plurality of concurrent accesses.

9. A system as in claim 1, wherein said one M-trie comprises access control information.

10. A system as in claim 1, wherein said one M-trie comprises accounting information.

11. A system as in claim 1, wherein said one M-trie comprises information for responding to packets.

12. A system as in claim 1, wherein said one M-trie comprises quality of service information.

13. A system as in claim 1, wherein said one M-trie comprises multicast routing information.

14. A system as in claim 1, wherein said one M-trie comprises information for routing decisions.

15. A system as in claim 1, wherein said one M-trie comprises information for routing decisions responsive to destination addresses and to source addresses.

16. A system as in claim 1, wherein said one M-trie comprises information for routing decisions responsive to source addresses.

17. A system as in claim 1, wherein said one M-trie comprises unicast routing information.

18. A method comprising the step of:
   recording, in a plurality of memory banks, at least one M-trie responsive to header information in a set of packets; and
   dynamically reallocating said nodes within said plurality of banks;
   wherein at least one node of said M-trie is recorded in at least two of said banks.

19. A method as in claim 18, further comprising the step of accessing said plurality of memory banks in parallel.

20. A method as in claim 18, further comprising the step of dynamically reallocating said nodes within said plurality of banks, said step of allocating being responsive to changes in relative frequency of access to said nodes.

21. A method as in claim 18, further comprising the step of dynamically reallocating said nodes within said plurality of banks, said step of reallocating being responsive to improving access throughput for references to said nodes.

22. A method as in claim 18, further comprising the step of dynamically reallocating said nodes within said plurality of banks, said step of reallocating being responsive to relative frequency of access to said nodes.

23. A method as in claim 18, wherein said at least one node is a node expected to be referenced frequently.

24. A method as in claim 18, wherein said at least one node is a root node for one of said at least one M-tries.

25. A method as in claim 18, wherein said at least one node is disposed for a plurality of concurrent accesses.

26. A method as in claim 18, wherein said one M-trie comprises access control information.

27. A method as in claim 18, wherein said one M-trie comprises accounting information.

28. A method as in claim 18, wherein said one M-trie comprises information for responding to packets.

29. A method as in claim 18, wherein said one M-trie comprises quality of service information.

30. A method as in claim 18, wherein said one M-trie comprises multicast routing information.

31. A method as in claim 18, wherein said one M-trie comprises information for routing decisions.

32. A method as in claim 18, wherein said one M-trie comprises information for routing decisions responsive to destination addresses and to source addresses.

33. A method as in claim 18, wherein said one M-trie comprises information for routing decisions responsive to source addresses.

34. A method as in claim 18, wherein said one M-trie comprises unicast routing information.

* * * * *